US008654671B2

(12) United States Patent
Shim et al.

(10) Patent No.: US 8,654,671 B2
(45) Date of Patent: Feb. 18, 2014

(54) SYSTEM AND METHOD FOR QOS SUPPORT IN UBIQUITOUS SENSOR

(75) Inventors: Woo Jin Shim, Seoul (KR); Yong Gil Park, Gyeonggi-do (KR); Jae Hwang Yu, Seoul (KR); Sung Cheol Hong, Seoul (KR); Se Hyun Oh, Seoul (KR)

(73) Assignee: SK Telecom Co., Ltd. (KR)

( * ) Notice: Subject to any disclaimer, the term of this patent is extended or adjusted under 35 U.S.C. 154(b) by 0 days.

(21) Appl. No.: 12/737,826

(22) PCT Filed: May 28, 2009

(86) PCT No.: PCT/KR2009/002846
§ 371 (c)(1),
(2), (4) Date: Mar. 24, 2011

(87) PCT Pub. No.: WO2010/021451
PCT Pub. Date: Feb. 25, 2010

(65) Prior Publication Data
US 2011/0299423 A1 Dec. 8, 2011

(30) Foreign Application Priority Data

Aug. 18, 2008 (KR) .................. 10-2008-0080525

(51) Int. Cl.
*H04L 12/28* (2006.01)
(52) U.S. Cl.
USPC ........................................................ 370/254
(58) Field of Classification Search
None
See application file for complete search history.

(56) References Cited

U.S. PATENT DOCUMENTS

| 7,136,392 | B2* | 11/2006 | Wentink | 370/445 |
|---|---|---|---|---|
| 7,224,679 | B2* | 5/2007 | Solomon et al. | 370/338 |
| 2006/0234740 | A1* | 10/2006 | Sakoda | 455/507 |
| 2007/0014269 | A1* | 1/2007 | Sherman et al. | 370/338 |
| 2008/0151848 | A1* | 6/2008 | Fischer et al. | 370/338 |
| 2008/0219196 | A1* | 9/2008 | Ptasinski | 370/311 |
| 2009/0016314 | A1 | 1/2009 | Kim | |
| 2009/0052429 | A1* | 2/2009 | Pratt et al. | 370/350 |
| 2009/0238133 | A1* | 9/2009 | Sakoda | 370/329 |

OTHER PUBLICATIONS

Jin-Seok Bae, et al., "Enhancement of IEEE 802.15.4 MAC for QoS and Mobility Support in Beacon-Enabled Mesh Networks", IEEE 802.15-07-0794-00-WNGO, Jul. 18, 2007. Ho-In Jeon, et al., "WiBEEM Technology for Wireless Home Network Services", ISO/IEC JTC1 SC25 WG1 Meeting, SC25/WG1 N1271, Mar. 26, 2007.*

(Continued)

Primary Examiner — Dang T. Ton
Assistant Examiner — Ronald H Davis
(74) Attorney, Agent, or Firm — Baker Hostetler, LLP

(57) ABSTRACT

The present invention relates to a system and to a method for QoS (Quality of Service) support in a ubiquitous sensor network. The system for QoS support in a ubiquitous sensor network includes a mesh coordinator and nodes. The mesh coordinator organizes a super frame containing a dedicated QoS data transmission period, and synchronizes each of the nodes constituted into one network with the abovementioned super frame. The nodes create a beacon frame containing information on whether or not to set QoS, to broadcast the beacon frame in a dedicated beacon period of the super frame if QoS data transmission is needed, to create a QoS data frame with a set priority, and to transmit the QoS data frame to the dedicated QoS data transmission period of the super frame in the case of transmitting QoS data. The present invention divides QoS data from general data to improve the quality of data transmission and ensure stability, and prioritizes QoS data to transmit the most important data among QoS data in a quick and stable manner.

18 Claims, 6 Drawing Sheets

(56) References Cited

OTHER PUBLICATIONS

Ho-In Jeon, "WiBEEM Addressing Scheme Based on NAA Algorithm for High-Speed Mobility of USN Devices", Journal of Ubiquitous Convergence Technology, vol. 1, No. 1, Oct. 2007. Ho-In Jeon, et al., "WiBEEM (Wireless Beacon-enabled Energy Efficient Mesh network) technology for BAN and U-City Services", IEEE 802.15-07-0576-00-0ban, Jan. 17, 2007.*

IEEE Std 802.11e-2005, Part 11: Wireless LAN Medium Access Control (MAC) and Physical Layer (PHY) specifications, Amendment 8: Medium Access Control (MAC) Quality of Service Enhancements, IEEE, Nov. 11, 2005, pp. 18-67 and 80-84.*

IEEE Std 802.15.4-2006, Part 15.4: Wireless Medium Access Control (MAC) and Physical Layer (PHY) Specifications for Low-Rate Wireless Personal Area Networks (WPANs), IEEE, Sep. 8, 2006, pp. 13-26 and 137-171.*

Ho-in Jeon, "Core technology for implementing u-City public/private service", TTA Journal No. 112, Jul. 2007, pp. 46-54.

Ho-in Jeon, "WiBEEM Technology as the Best USN Architecture for Implementing u-City Public and Value-Added Services", Korea Information Science Society Journals vol. 25 No. 12, Dec. 2007, pp. 49-59.

Enhancement of IEE 802.15.4 MAC for QoS and Mobility Support in Beacon-Enabled Wireless Mesh Networks; IEE Standards Association-Documents; Jin-Seok Bae, et al.; 20071222; Jul. 2007.

WiBEEM Technology for Wireless Home Network Services ISO/IEC JTCI SC 25 WG1 Meeting, Ho In Jeon et al.; Mar. 26, 2007.

* cited by examiner

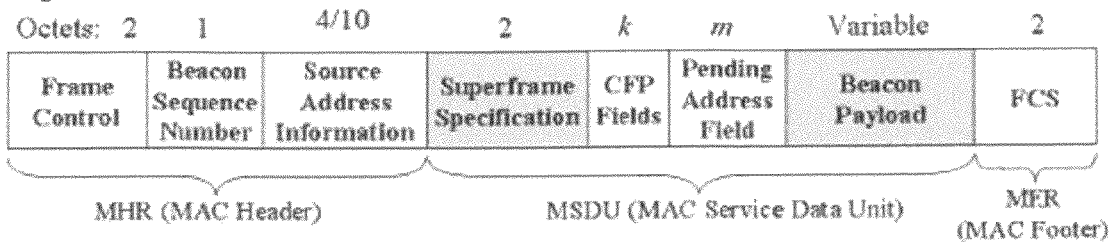

| Priority value (QoS Priority value) | Backoff Number |
|---|---|
| 0 (11) | 0-5 |
| 1 (10) | 0-7 |
| 2 (01) | 0-10 |
| 3(00) | 11-15 |

SYSTEM AND METHOD FOR QOS SUPPORT IN UBIQUITOUS SENSOR

TECHNICAL FIELD

The present invention relates to a system and method for QoS (Quality of Service) support in ubiquitous sensor network and, more particularly, to a system and method for QoS support in ubiquitous sensor network, wherein a superframe including a QoS data slot is coordinated, the superframe is synchronized with each of nodes constructing one network, neighboring nodes are informed of whether QoS data will be transmitted using a beacon frame if the QoS data needs to be transmitted, a QoS data frame having a set priority is generated, and the QoS data frame having the set priority is transmitted in the QoS data slot according to priority so that data priorities between the QoS data can be distinguished.

BACKGROUND ART

The Ubiquitous Sensor Network (USN) is one of the core techniques of ubiquitous computing technology and is technology in which data generated by combining a variety of sensor nodes is associated with an application server. Unlike common sensors, but like intelligent computers, the sensors have the ability to collect or process various cases of generated data.

Monitoring using a single sensor is limited in terms of a monitoring area or accuracy according to the level of hardware. If pieces of information collected by several nodes are merged, however, the information can be monitored more accurately and reliably than the situations of the real world.

Fields to which the USN may be applied include monitoring fields for a variety of phenomena in the real world, such as disaster prevention, environment monitoring, intelligent physical distribution management, real-time monitoring, mobile healthcare, home security, and machine diagnosis and may also include a lot of application fields requiring remote monitoring.

In the USN, a lot of nodes are distributed in order perform monitoring tasks over a wide area, data sensed by sensors is changed to upper events through data processing within the network and then transferred to a remote administrator. Here, data is transmitted through a multi-hop wireless network of a low speed and low power.

Meanwhile, in Korea, the USN (that is, the next-generation network), together with IPv6 and BcN, has been selected as one of the three infra technologies of IT 839, and all its strength is being concentrated on the development of the technology.

Such wireless communication network techniques include techniques, such as Bluetooth, ZigBee, and Motes. The techniques, however, are impossible to use for u-City Core service because they have various problems, such as an excessively long association time, insufficient extensibility to the mesh network, non-mobility support for devices, great power consumption, and difficulty in extending addressing. In order to solve the problems, a Wireless Beacon-enabled Energy-Efficient Mesh network (WiBEEM) technology has been developed.

In the newly developed WiBEEM technology, all networks are synchronized as one network using a beacon and are configured to support a mesh network operation with low power on the basis of a beacon collision avoidance technique. Furthermore, since short addresses can be efficiently allocated using a Next Address Available (NAA)-based address allocation method, a maximum of 65,536 devices can be controlled. Accordingly, the WiBEEM technology can be used not only within a home, but also in the u-City.

The most significant characteristic of the WiBEEM technology lies in that the WiBEEM technology is an efficient wireless network in which a mesh network is stably operated even in the beacon mode, thus consuming low power. The fact that the wireless mesh network is stably operated corresponds to technology which is one step higher than the existing wireless communication technology using wired communication technology as a backbone network, and it is meant that not only all sensor network nodes within a communication range, but also nodes outside the RF range can communicate with each other through intermediate nodes if the intermediate nodes exist.

The above WiBEEM technology is a wireless protocol which provides an efficient communication method for WPAN applications and supports mobility according to ubiquitous environments.

An advantage when the mesh network is operated in the beacon mode, as in the WiBEEM protocol, is that the efficiency of power consumption can be improved because each node can determine the time of an inactive period in which the node can enter a period where it is operated in a deep sleep mode period DSP.

The WiBEEM protocol also has a significant advantage in that it supports mobility. If mobility is supported, autonomy in the communication area where free communication is possible anywhere within the WPAN can be achieved.

The conventional WiBEEM standard, however, is not USN technology supporting stable QoS. For example, in the case where an old person pays a higher service charge than other people and asks for his stable health, a system capable of providing different kinds of services from only very basic services required for healthy young men with a small amount of money and QoS according to the different kinds of services has to be provided to the old person. Accordingly, in the WiBEEM technology, QoS support technology has a very important meaning.

Furthermore, in the case of underground utility management, sensor information for the leakage detection of city gas requires a different level of QoS from sensor information for water service management. Accordingly, a method of differently arranging QoS parameters according to different services and setting a different backoff time in a Contention Access Period (CAP) period needs to be used.

DISCLOSURE

Technical Problem

An object of the present invention is to provide a system and method for QoS support in a ubiquitous sensor network, which is capable of providing stable QoS to WiBEEM devices in which a wireless communication network is configured.

Another object of the present invention is to provide a system and method for QoS support in a ubiquitous sensor network, which is capable of informing neighboring nodes of QoS data and distinguishing the priorities of QoS data by placing different priorities to the QoS data, in a wireless communication network.

Yet another object of the present invention is to provide a system and method for QoS support in a ubiquitous sensor network, which is capable of improving the quality of data transmission and securing the stability of data transmission by distinguishing QoS data from common data and of transmitting data having the highest priority, from among QoS data, most rapidly and stably by placing priorities to the QoS data.

Still yet another object of the present invention is to provide a system and method for QoS support in a ubiquitous sensor network, which is capable of guaranteeing the transmission of priority data when a lot of network nodes using a variety of wireless network techniques are dispersed within a network.

Technical Solution

According to an aspect of the present invention, there is provided a system for QoS (Quality of Service) support in a ubiquitous sensor network, including a mesh coordinator for coordinating a superframe including a QoS data slot and synchronizing the superframe and each of nodes within the network and the nodes each for creating a beacon frame, including information about whether QoS has been set, broadcasting the created beacon frame in the beacon-only period of the superframe, creating a QoS data frame having a set priority, and transmitting the created QoS data frame in the QoS data slot of the superframe.

It is preferred that the mesh coordinator be a node first created in the configured network.

It is preferred that the mesh coordinator create the beacon frame, including the information about whether QoS has been set, broadcast the created beacon frame in the beacon-only period of the superframe, create the QoS data frame having a set priority, and transmit the created QoS data frame in the QoS data slot of the superframe.

It is preferred that the superframe include a beacon-only period BOP (that is, a period where the beacon frame is transmitted), a QoS data slot PQP for QoS data transmission, a contention access period CAP, a common data transmission period CFP for common data transmission, and a deep sleep mode period DSP.

It is preferred that the mesh coordinator or the node transmit QoS data, created by the mesh coordinator or the node, in the QoS data slot in order of higher priority.

It is preferred that the mesh coordinator or the node arrange a plurality of data frames in order of higher priority when the plurality of data frames is received and transmit the plurality of data frames to other nodes in order of the higher priority.

It is preferred that a priority of the QoS data frame be set by the mesh coordinator for every node or by default for every node.

It is preferred that each of the nodes be activated when its own address corresponds to the beacon frame when the beacon frame is broadcasted by the mesh coordinator or other nodes and be in an inactive state when the address does not correspond to the beacon frame.

According to another aspect of the present invention, there is provided a mesh coordinator for QoS support in a ubiquitous sensor network, including a communication unit for communicating with nodes; a superframe structure coordinator unit for coordinating a superframe structure, including a QoS data slot, and synchronizing the superframe and each of the nodes configuring one network; a beacon frame control unit for creating a beacon frame, including information about whether QoS has been set, and broadcasting the created beacon frame in the beacon-only period of the superframe created by the superframe structure coordinator unit; and a QoS data processing unit for placing priority to a relevant data frame based on the information about whether QoS has been set, included in the beacon frame created by the beacon frame control unit, and transmitting the relevant data frame in the QoS data slot of the superframe.

The mesh coordinator according to claim 9, further include a beacon scheduling information control unit for transmitting beacon scheduling information, including its own beacon slot information and beacon slot information about neighboring nodes, to the neighboring nodes so that the neighboring nodes can determine their beacon slots.

It is preferred that the mesh coordinator for QoS support in the ubiquitous sensor network further include a common data processing unit for transmitting a relevant data frame in the common data transmission period of the superframe based on the information about whether QoS has been set, included in the beacon frame created by the beacon frame control unit.

It is preferred that the beacon frame control unit create the beacon frame, including a Frame Control field, a Beacon Sequence Number field, a Source Address Information field, a Superframe Specification field indicating whether QoS has been set, CFP fields, a Pending Address Field indicating a specification of an address waiting for transmission, a Beacon Payload field indicating PQPL information, and an FCS field.

It is preferred that the Super Specification field include a Beacon Order subfield to stipulate a transmission interval of a beacon, a Superframe Order subfield to stipulate a length of time during a period where the superframe is active, including a beacon frame transmission time, a Final CAP Slot subfield to indicate a duration of CAP, a Battery life Extension subfield, a PQP Enabled subfield to indicate whether QoS has been set, a PAN Coordinator subfield, and an Association permit subfield.

It is preferred that the Beacon Payload field include a BOPL subfield to determine whether how many beacons will be transmitted within a BOP size, a MyBTTS (BeaconTx-TimeSlot) subfield to indicate a beacon transmission time of a node transmitting a beacon, a BTTSL (Beacon Tx Time Slot Length) subfield to indicate the size of a beacon slot transmitted by itself, a Depth subfield to indicate depth information about a node transmitting a beacon, an NAA (Next Address Available) subfield to inform the value of an address to be newly allocated, a Child Short Address subfield to insert the address value of a child node having a parent-child relationship and requesting connection to a node transmitting a beacon, a Parent Short Address subfield to insert the address value of a parent node corresponding to the address value of the child node, a HOP Count subfield, a Child Device Type subfield, a My Profile ID subfield, and a PQPL subfield which is a PQP Length and generated when the value of PQP Enabled within the Super Specification field of the beacon frame is 1.

It is preferred that in the case where QoS data is transmitted, the beacon frame control unit create the beacon frame by setting the value of PQP Enabled within the Super Specification field of the beacon frame to 1, determining whether the QoS data will be transmitted during which period of the superframe, and indicating a PQPL value within the Beacon Payload field.

It is preferred that the QoS data processing unit create the QoS data frame, including a Frame Control field having QoS priority set therein, a Sequence Number field indicating a sequence ID unique to a transmitted frame, four addressing fields, a Frame Payload field, and a Frame Check Sequence (FCS) field for error detection.

It is preferred that if two or more data is received within the QoS data slot, the QoS data processing unit arrange the two or more data according to priority and transmit the arranged data to other nodes in order of the priority.

According to yet another aspect of the present invention, there is provided a node for QoS support in a ubiquitous sensor network, including a communication unit configured to transmit and receive a beacon and data over a network using the superframe having a beacon-only period; a superframe synchronization unit synchronized with the superframe received from a mesh coordinator through the communication unit; a beacon slot determination unit configured to determine its own beacon slot in a period other than beacon slots of neighboring nodes from the beacon-only period of the superframe synchronized by the superframe synchronization unit and to control the communication unit so that a beacon frame is transmitted in the determined beacon slot; a beacon frame control unit configured to create the beacon frame, including information about whether QoS has been set, and to transmit the created beacon frame in the beacon slot determined by the beacon slot determination unit; and a QoS data processing unit configured to place priority to a relevant data frame based on the information about whether QoS has been set, included in the beacon frame created by the beacon frame control unit, and to transmit the data frame in the QoS data slot of the superframe.

It is preferred that the node for QoS support in the ubiquitous sensor network further include a beacon scheduling information control unit for transmitting beacon scheduling information, including the own beacon slot information and beacon slot information about neighboring nodes, to the neighboring nodes so that the neighboring nodes can determine their beacon slots.

It is preferred that the node for QoS support in the ubiquitous sensor network further include a common data processing unit for transmitting a relevant data frame in the common data transmission period of the superframe based on the information about whether QoS has been set, included in the beacon frame created by the beacon frame control unit.

It is preferred that if two or more data is received within the QoS data slot, the QoS data processing unit arrange the two or more data according to priority and transmit the arranged data to other nodes in order of the priority.

According to still yet another aspect of the present invention, there is provided a method of a mesh coordinator transmitting a QoS data frame for QoS support in a ubiquitous sensor network, including the steps of (a) coordinating a superframe, including a QoS data slot, and synchronizing the superframe and each of nodes constructing one network; (b) creating a beacon frame having QoS set therein, transmitting the beacon frame in the beacon-only period of the superframe, and creating a QoS data frame having a set priority; and (c) when the QoS data slot is reached according to the superframe, transmitting the QoS data frame.

It is preferred that the step (a) include the steps of calculating a beacon interval, a superframe duration, the beacon-only period, the QoS data slot, and a common data transmission period; coordinating the superframe, configured in order of a beacon-only period BOP, a QoS data slot PQP, a contention access period CAP, a common data transmission period CFP, and a deep sleep mode period DSP, based on the pieces of calculated period information; and synchronizing the coordinated superframe and each of the nodes constructing one network.

It is preferred that the beacon frame having QoS set therein be created by setting the value of PQP Enabled within a Super Specification field to 1, determining whether the QoS data will be transmitted during which period of the superframe, and indicating a PQPL value within a Beacon Payload field.

According to still yet another aspect of the present invention, there is provided a method of a mesh coordinator coordinating a superframe structure for QoS support in a ubiquitous sensor network, including the steps of calculating a beacon interval and a superframe duration; finding a beacon-only period by calculating a BTTSL (Beacon Tx Time Slot Length) and a maximum beacon number (maxBeaconNumber), included in the beacon frame; finding a QoS data slot by calculating a PQPL (PQP size) and aBaseDuration included in a beacon frame, after the found beacon-only period; finding a common data transmission period by calculating a CFPL and aBaseDuration included in the beacon frame; finding a CAP period using a value in which the beacon-only period, the QoS data slot, and the common data transmission period are subtracted from a superframe duration, between the common data transmission period and the QoS data slot; and setting a period other than the superframe duration period in the calculated beacon interval as a deep sleep mode period DSP.

According to still yet another aspect of the present invention, there is provided a method of a node transmitting a QoS data frame for QoS support in a ubiquitous sensor network, including the steps of (a) creating a beacon frame having QoS set therein and determining its own beacon slot period; (b) transmitting the created beacon frame in the determined beacon slot period and creating a QoS data frame having a set priority; and (c) transmitting the created QoS data frame in the QoS data slot of the superframe synchronized by the mesh coordinator.

Advantageous Effects

As described above, according to the present invention, there can be provided a system and method for QoS support in a ubiquitous sensor network, which is capable of providing stable QoS to WiBEEM devices in which a wireless communication network is configured.

Furthermore, there can be provided a system and method for QoS support in a ubiquitous sensor network, which is capable of informing neighboring nodes of QoS data and distinguishing the priorities of QoS data by placing different priorities to the QoS data, in a wireless communication network.

Furthermore, there can be provided a system and method for QoS support in a ubiquitous sensor network, which is capable of improving the quality of data transmission and securing the stability of data transmission by distinguishing QoS data from common data and of transmitting data having the highest priority, from among QoS data, most rapidly and stably by placing priorities to the QoS data.

Furthermore, there can be provided a system and method for QoS support in a ubiquitous sensor network, which is capable of guaranteeing the transmission of priority data when a lot of network nodes using a variety of wireless network techniques are dispersed within a network and of providing more various services to users who use a ubiquitous network, through the implementation of QoS.

DESCRIPTION OF DRAWINGS

FIG. 5 is a diagram showing the structure of a beacon frame for QoS setting according to the present invention;

FIG. 6 is a detailed diagram showing a Superframe Specification field within the beacon frame shown in FIG. 5;

FIG. 7 is a detailed diagram showing a Beacon Payload field within the beacon frame shown in FIG. 5;

FIG. 8 is a diagram showing the structure of a QoS data frame in which QoS has been set according to the present invention;

DESCRIPTION OF REFERENCE NUMERALS OF PRINCIPAL ELEMENTS IN THE DRAWINGS

Figure 1:
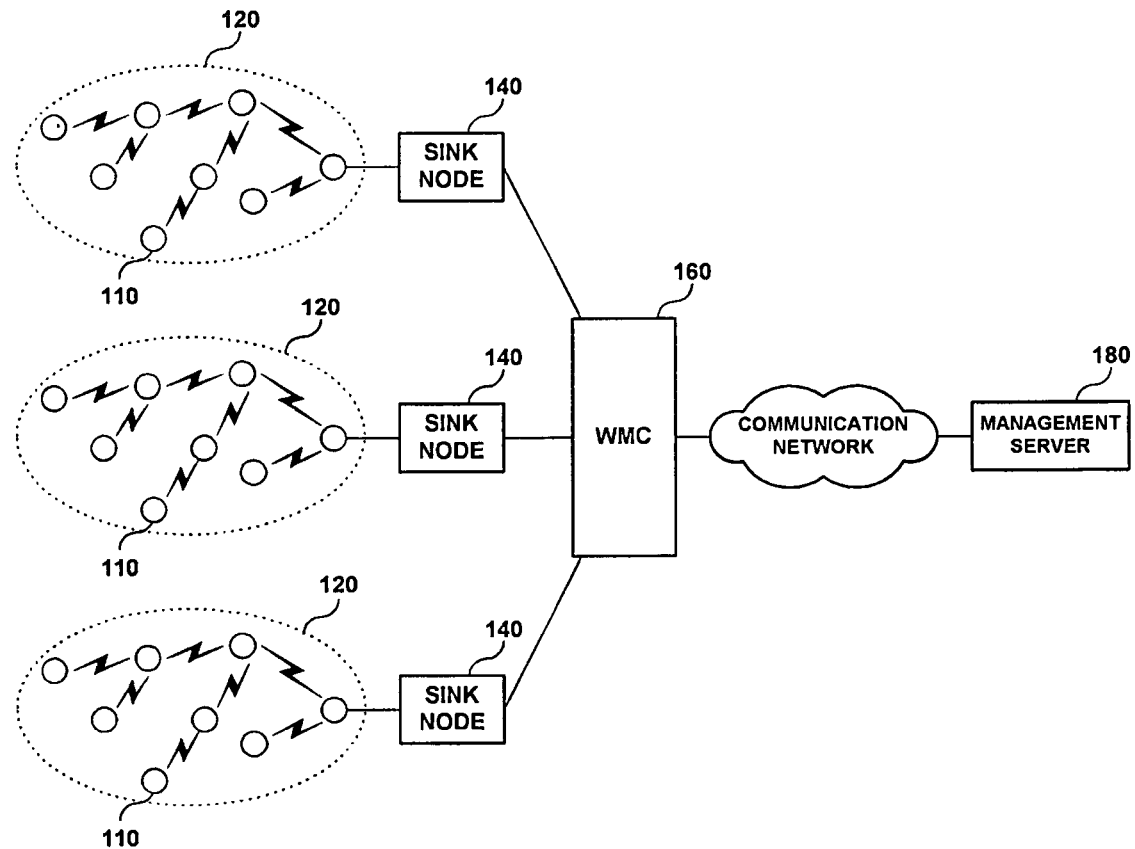
FIG. 1 is a diagram showing a system for QoS support in a ubiquitous sensor network according to the present invention.

110: sensor node
120: sensor field
140: sink node
160: WiBEEM mesh coordinator (WMC)
162, 302: communication unit
164: superframe structure coordinator unit
166, 308: beacon frame control unit
168, 310: QoS data processing unit
170, 312: common data processing unit
180: management server
300: node
304: superframe synchronization unit
306: beacon slot determination unit
314: beacon scheduling information control unit

MODE FOR INVENTION

Hereinafter, detailed contents about the objects, technical configurations, and operational effects thereof according to the present invention will be more clearly understood from the following detailed description of the present invention, which will be described with reference to the attached drawings.

FIG. 1 is a diagram showing a system for QoS support in a ubiquitous sensor network according to the present invention.

Referring to FIG. 1, the system for QoS support in a ubiquitous sensor network includes sensor nodes 110 configured to include sensors for sensing pieces of recognition information about things or pieces of neighboring environmental information in real time and communication modules, sensor fields 120 each configured to include a set of the sensor nodes 110, sink nodes 140 each configured to receive pieces of information collected by the sensor field 120, and a WiBEEM mesh coordinator (WMC) 160 configured to route the information transmitted by the sink nodes 140 and transmit the information to a management server 180 over a communication network.

In this configuration, one sink node 140 is responsible for one sensor field 120. In order to efficiently manage the power source of each of the sensor nodes 110, a MAC protocol is configured so that the power source of the sensor node 110 is minimized during an inactive period in which the power source is not used and the power source is used during an active period in which the power source is used The sink node 140 refers to a common node existing within a wireless communication network, and it may be referred to as a WiBEEM Routable Coordinator (WRC). The sensor node 110 and the sink node 140 are hereinafter referred to as nodes 110 and 140.

The WiBEEM mesh coordinator 160 refers to a node that is generated within the ubiquitous sensor network for the first time, and it may be referred to as a gateway.

The WiBEEM mesh coordinator 160 is hereinafter referred to as a mesh coordinator.

If QoS data needs to be transmitted, the mesh coordinator 160 coordinates a superframe including a QoS data slot and synchronizes the superframe and each of the nodes 110 and 140 constructing one wireless communication network. In this case, the nodes 110 and 140 include the sensor node 110 and the sink node 140.

Furthermore, the mesh coordinator 160 creates a beacon frame, including information about whether QoS has been set, according to whether QoS data needs to be transmitted and broadcasts the created beacon in the beacon-only period of a superframe. If QoS data needs to be transmitted, the mesh coordinator 160 creates a QoS data frame having a set priority and transmits the created QoS data frame in the QoS data slot of the superframe.

In other words, if QoS data needs to be transmitted, the mesh coordinator 160 informs that the QoS data will be transmitted to neighboring nodes by setting QoS in the beacon frame and distinguishes the priorities of data by setting the priorities in the data frame.

Furthermore, the mesh coordinator 160 transmits QoS data created by the mesh coordinator 160 in the QoS data slot in order of higher priority.

Furthermore, if a plurality of QoS data frames is received, the mesh coordinator 160 arranges the QoS data frames in order of higher priority and transmits the QoS data frames to different nodes or the management server 180 in order of priority. In this case, the mesh coordinator 160 may set the priority for every node, by default for every node, or for every datum or application.

The nodes 110 and 140 create a beacon frame, including information about whether QoS has been set, according to whether QoS data needs to be transmitted and broadcast the created beacon frame in the beacon-only period of the superframe. Furthermore, if QoS data needs to be transmitted, the nodes 110 and 140 create a QoS data frame having a set priority and transmit the created QoS data frame in the QoS data slot of the superframe.

That is, the nodes 110 and 140 inform neighboring nodes that QoS data will be transmitted by setting QoS in the beacon frame, if the QoS data needs to be transmitted, and distinguishes the priorities of data by setting the priorities in a data frame.

Furthermore, the nodes 110 and 140 are activated if their addresses correspond to a beacon frame when the beacon frame is broadcasted by the mesh coordinator 160 or other node, but are in an inactive state if their addresses do not correspond to the beacon frame.

Furthermore, the nodes 110 and 140 analyze a beacon frame from the mesh coordinator 160 or other node, and they are activated when their addresses correspond to the beacon frame. The activated nodes 110 and 140 create a beacon frame, including information about whether QoS has been set, and broadcast the created beacon frame in the beacon-only period of the superframe. If the QoS has been set, the nodes 110 and 140 create a QoS data frame having a set priority and transmit the created QoS data frame in the QoS data slot of the superframe. If the QoS has not been set, the nodes 110 and 140 transmit the corresponding data in a common data transmission period.

Furthermore, the nodes 110 and 140 transmit their QoS data in the QoS data slot in order of higher priority.

Furthermore, if a plurality of QoS data frames is received, the nodes 110 and 140 arrange the QoS data frames in order of higher priority and transmit the QoS data frames to other nodes or the mesh coordinator 160 in order of priority.

The mesh coordinator (110, 140) and the nodes 110 and 140 distinguish data of higher priority from common data by placing priorities to QoS data and preferentially process the data of higher priority.

Figure 2:
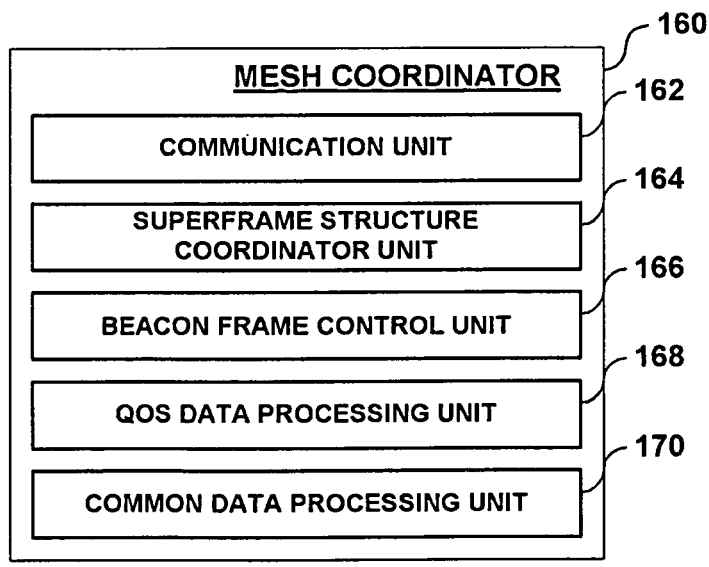
FIG. 2 is a block diagram schematically showing the configuration of a mesh coordinator for QoS support according to the present invention.

FIG. 2 is a block diagram schematically showing the configuration of the mesh coordinator for QoS support according to the present invention.

Referring to FIG. 2, the mesh coordinator 160 for QoS support includes a communication unit 162 for communication with nodes, a superframe structure coordinator unit 164, a beacon frame control unit 166, a QoS data processing unit 168, and a common data processing unit 170.

The superframe structure coordinator unit 164 functions to coordinate the structure of a superframe including a QoS data slot and to synchronize the superframe and each of nodes constructing one network.

The superframe coordinated by the superframe structure coordinator unit 164 is divided into a beacon-only period BOP (that is, a period where one or more beacon frames are transmitted), a QoS data slot PQP for QoS data transmission, a contention access period CAP, a common data transmission period CFP for real-time transmission of common data, and a deep sleep mode period DSP.

Figure 4:
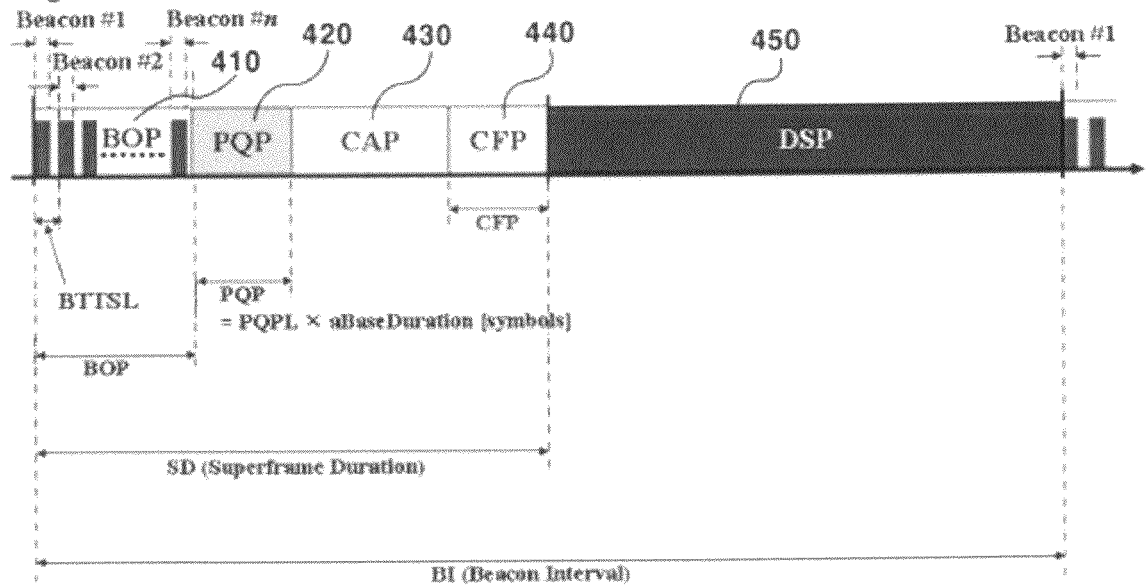
FIG. 4 is a diagram showing the structure of a superframe structure for QoS support according to the present invention.

For a detailed description of the superframe, reference can be made to FIG. 4.

The superframes configured as described above have the same structure in all nodes constructing one wireless communication network and have the same intervals. The superframe structures are synchronized with each other and used.

In order to implement QoS data using the created superframe structure, priority is given to QoS data so that the QoS data can be processed separately from common data.

In order to implement QoS, neighboring nodes have to be informed of whether QoS has been set or not. If it is sought to use QoS, the beacon frame control unit 166 creates a beacon frame, indicating information about whether QoS has been set, in order to inform that it has QoS data.

That is, the beacon frame control unit 166 creates a beacon frame, including information about whether QoS has been set, according to whether QoS data needs to be transmitted and broadcasts the beacon frame in the beacon-only period of a superframe created by the superframe structure coordinator unit 164.

The beacon frame created by the beacon frame control unit 166 includes a Frame Control field, a Beacon Sequence Number field, a Source Address Information field, a Superframe Specification field indicating whether QoS has been set, CFP fields, a Pending Address field indicating the specification of addresses waiting for transmission, a Beacon Payload field indicating PQPL information, and an FCS field.

For a detailed description of the beacon frame configured as described above, reference can be made to FIG. 5.

The beacon frame control unit 166 informs neighboring nodes that QoS data will be transmitted through this superframe by setting the value of a PQP Enabled subfield within the Superframe Specification field of a beacon frame to 1, if the QoS data needs to be transmitted. The beacon frame control unit 166 informs neighboring nodes that it does not have QoS data by setting the value of the PQP Enabled subfield to 0.

That is, if QoS data needs to be transmitted, the beacon frame control unit 166 sets the value of the PQP Enabled subfield within the Superframe Specification field of a beacon frame to 1, determines whether QoS will be used during which period within a superframe, and creates the beacon frame requiring QoS data transmission by indicating the value in a PQPL subfield within a Beacon Payload field of the beacon frame.

For the Beacon Payload field of the beacon frame created by the beacon frame control unit 166, reference can be made to FIG. 7.

After QoS data is determined to be transmitted through the above beacon frame, the QoS data has to be substantially transmitted to a destination. Although the QoS data has already been informed that it will be transmitted through a beacon, the QoS data has also to be informed even in the front part of the data substantially transmitted. QoS data has the highest priority data as compared with common data, but may have lower priority than QoS data having the highest priority. Accordingly, priority is given to the QoS data.

A distinction between QoS data and common data and the allocation of priority to QoS data are performed by the QoS data processing unit 168.

If QoS has been set in a beacon frame created by the beacon frame control unit 166, the QoS data processing unit 168 sets priority in a corresponding data frame and transmits the QoS data frame in the QoS data slot of the superframe.

The QoS data frame having the priority set by the QoS data processing unit 168 includes a Frame Control field having QoS priority set therein, a Sequence Number field indicating a sequence ID unique to a transmitted frame, four addressing fields, a Frame Payload field, and a Frame Check Sequence (FCS) field for error detection.

For a detailed description of the QoS data frame configured as described above, reference can be made to FIG. 8.

If two or more data is received within a QoS data slot, the QoS data processing unit 168 arranges the data according to priority and transmits the data to other nodes in order of priority.

If QoS is not set in the beacon frame created by the beacon frame control unit 166, the common data processing unit 170 transmits a corresponding data frame in the common data transmission period of the superframe.

Figure 3:
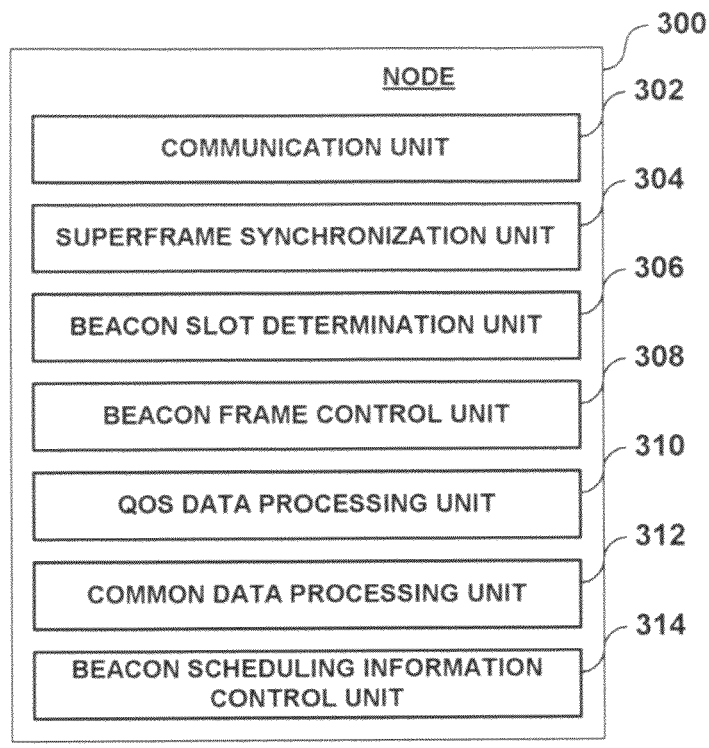
FIG. 3 is a block diagram schematically showing the configuration of a node in which the mesh coordinator for QoS support and a network are configured according to the present invention.

FIG. 3 is a block diagram schematically showing the configuration of a node in which the mesh coordinator for QoS support and a network are configured according to the present invention.

Hereinafter, the node in which the mesh coordinator for QoS support and the network are configured refers to the sensor node 110 or the sink node 140 shown in FIG. 1.

Referring to FIG. 3, the node 300 in which the mesh coordinator and the network are configured includes a communication unit 302, a superframe synchronization unit 304, a beacon slot determination unit 306, a beacon frame control unit 308, a QoS data processing unit 310, a common data processing unit 312, and a beacon scheduling information control unit 314.

The communication unit 302 performs the transmission and reception of beacons and data over a network using a superframe, having a beacon-only period where two or more beacons are transmitted, within one superframe.

The superframe synchronization unit 304 synchronizes superframes transmitted by the mesh coordinator through the communication unit 302.

The beacon slot determination unit 306 determines its own beacon slot in a period other than the beacon slots of neighboring nodes, from among the beacon-only periods of the superframes synchronized by the superframe synchronization unit 304, and controls the communication unit 302 so that a beacon frame is transmitted in the determined beacon slot.

If there is data to be transmitted, the beacon frame control unit 308 creates a beacon frame, including information about whether QoS has been set, according to whether QoS data needs to be transmitted and transmits the created beacon frame in the beacon slot determined by the beacon slot determination unit 306.

The beacon frame created by the beacon frame control unit 308 is equivalent to the beacon frame of FIG. 5, and a description thereof is omitted.

If QoS has been set in the beacon frame created by the beacon frame control unit 308, the QoS data processing unit 310 gives priority to a corresponding data frame and transmits the created QoS data frame in the QoS data slot of the superframe.

The QoS data frame created by the QoS data processing unit 310 is equivalent to the beacon frame of FIG. 8, and a description thereof is omitted.

If two or more data is received within the QoS data slot, the QoS data processing unit 310 arranges the two or more data according to priority and transmits the data to other nodes in order of priority.

In order for neighboring nodes to determine their beacon slots, the beacon scheduling information control unit 314 transmits beacon scheduling information, including its own beacon slot information and beacon slot information about neighboring nodes, to the neighboring nodes.

If QoS has not been set in the beacon frame created by the beacon frame control unit 308, the common data processing unit 312 transmits a corresponding data frame in the common data transmission period of the superframe.

FIG. 4 is a diagram showing the structure of a superframe structure for QoS support according to the present invention.

Referring to FIG. 4, the superframe is divided into a beacon-only period BOP (that is, a period where one or more beacon frames are transmitted) 410, a QoS data slot PQP 420 for QoS data transmission, a contention access period CAP 430, a common data transmission period CFP 440 for real-time transmission of common data, and a deep sleep mode period DSP 450.

The beacon-only period 410 is a period necessary for beacon scheduling and is found by the product of a beacon slot size BTTSL, transmitted by itself, and a maximum beacon number maxBeaconNumber. The beacon slot size BTTSL is indicated within a beacon frame.

The QoS data slot 420 is found by the product of a PQP size PQPL and the symbol number of a slot (aBaseDuration) constituting a superframe when a superframe order is '0'. The PQP size PQPL is indicated within a beacon frame.

The common data transmission period CFP 440 is found by the product of a CFP size CFPL and the symbol number of a slot (aBaseDuration) constituting a superframe when a superframe order is '0'.

The contention access period CAP 430 is placed between the QoS data slot 420 and the common data transmission period 440 and is a value in which the beacon-only period 410, the QoS data slot 420, and the common data transmission period 440 are subtracted from a Superframe Duration (SD). The SD is found by the product of aBaseSuperframeduration and $2^{SO}$. The aBaseSuperframeduration refers to the number of symbols constituting a superframe when a superframe order is '0'.

The deep sleep mode period DSP 450 is a period for utilizing a low-power function, and it refers to a period in which the SD is excluded from a Beacon Interval (BI). The beacon interval is found by the product of the aBaseSuperframeduration and $2^{BO}$.

The superframes configured as described above have the same structure in nodes constructing one network and have the same interval. The superframes are synchronized and used.

Each node completes the transmission and reception of data necessary for one superframe period. Data is transmitted and received in the middle of a data transmission period of the superframe period, unless the data is divided and transmitted. If data is not transmitted within the superframe period, the data is transmitted and received in a next superframe period.

In FIG. 4, the common data transmission period CFP 440 is illustrated to exist in the superframe. However, the common data transmission period CFP 440 is an optional portion and may not exist. The CAP may occupy the optional portion.

FIG. 5 is a diagram showing the structure of a beacon frame for QoS setting according to the present invention, FIG. 6 is a detailed diagram showing a Superframe Specification field within the beacon frame shown in FIG. 5, and FIG. 7 is a detailed diagram showing a Beacon Payload field within the beacon frame shown in FIG. 5.

Referring to FIG. 5, the beacon frame includes a Frame Control field, a Beacon Sequence Number field, a Source Address Information field, a Superframe Specification field indicating whether QoS has been set, CFP fields, a Pending Address field indicating the specification of an address waiting for transmission, a Beacon Payload field indicating PQPL information, and an FCS field.

When the beacon frame configured as described above is used, a network node is activated only when its own address is checked, but returns to an inactive mode when its own address is not checked, when a beacon is broadcasted.

If QoS data needs to be transmitted, the value of the PQP Enabled subfield within the Superframe Specification field of the beacon frame is set to 1, thus informing neighboring nodes that the QoS data will be transmitted through this superframe. The value of the PQP Enabled subfield is set to 0 in order to inform neighboring node that QoS data does not exist.

The Superframe Specification field is described in more detail with reference to FIG. 6.

Referring to FIG. 6, the Superframe Specification field includes a Beacon Order subfield to stipulate the transmission interval of a beacon, a Superframe Order subfield to stipulate the length of time during the period where a superframe is active, including a beacon frame transmission time, a Final CAP Slot subfield to indicate the duration of CAP, a Battery life Extension subfield, a PQP Enabled subfield to indicate whether QoS has been set, a PAN Coordinator subfield, and an Association permit subfield.

The Beacon Order subfield has the length of 4 bits and stipulates the transmission interval of a beacon. When the BO is the beacon transmission interval and the BI is the beacon interval, the following equation is established.

$$BI = aBaseSuperframeduration * 2^{BO} \text{ symbols, where } 0 \leq BO \leq 14.$$

The Superframe Order subfield has the length of 4 bits and indicates the length of time during the period where a superframe is active (when a receiver is available), including a beacon frame transmission time. Nodes have to be able to communicate with each other in the PAN only in the period where a superframe is active period. The SO (that is, the value of a Superframe Order) and the SD (that is, a Superframe Duration value) are calculated as follows.

$$0 \le SO \le BO \le 14, SD = aBaseSuperframeduration * 2^{SO}$$
symbols.

In this case, when SO=15, a superframe should not enter the active period immediately after it sends a beacon.

The Final CAP Slot subfield should be an aMinCAPLength value or higher. In the case where the length of a beacon frame needs to be increased in order to execute CFP maintenance management, however, an exception in which the Final CAP Slot subfield may be temporarily smaller than the aMinCAPLength value may be applied.

The Battery life Extension subfield has the length of 1 bit.

The PQP Enabled subfield is a subfield to inform whether QoS is used. If the value of the PQP Enabled subfield is 1, it means that QoS is used. If the value of the PQP Enabled subfield is 0, it means that QoS is not used.

The PAN Coordinator subfield has the length of 1 bit. If a beacon frame is transmitted from the mesh coordinator, the PAN Coordinator subfield is set to '1'. If a beacon frame is not transmitted from the mesh coordinator, the PAN Coordinator subfield is set to '0'.

The Association permit subfield has the length of 1 bit. If macAssociationPermit is TRUE (when the mesh coordinator permits association in a PAN), the Association permit bit is set to 1. If the mesh coordinator does not accept an association request in its own network, the Association permit bit is set to 0.

If QoS data needs to be transmitted, the value of the PQP Enabled subfield within the Superframe Specification field of a beacon frame is set to 1, whether QoS will be used during which period in the superframe is determined, and the beacon frame requiring QoS data transmission is created by indicating the value in the PQPL subfield of the Beacon Payload field.

The Beacon Payload field of the beacon frame is described in more detail with reference to FIG. 7.

Referring to FIG. 7, the Beacon Payload field includes a BOPL subfield to determine whether how many beacons will be transmitted within a BOP size, a MyBTTS (BeaconTx-TimeSlot) subfield to indicate the beacon transmission time of a node that transmits a beacon, a BTTSL (Beacon Tx Time Slot Length) subfield to indicate the size of a beacon slot transmitted by itself, a Depth subfield to indicate depth information about a node that transmits a beacon, an NAA (Next Address Available) subfield to inform the value of an address to be newly allocated, a Child Short Address subfield to insert the address value of a child node having a parent-child relationship and requesting connection to a node that transmits a beacon, a Parent Short Address subfield to insert the address value of a parent node corresponding to the address value of the child node, a HOP Count subfield, a Child Device Type subfield, a My Profile ID subfield, and a PQPL subfield which is a PQP Length and is generated when the value of the PQP Enabled subfield within the Super Specification field of a beacon frame is 1.

The BTTSL (Beacon Tx Time Slot Length) subfield indicates the size of a beacon slot transmitted by itself. The BTTSL subfield indicates that one network has to have the same value and indicates the sum of the size of a beacon transmitted by itself and a TxBeaconMargin value. The total size of a BOP may be calculated by multiplying the Max Beacon Number and the BTTSL value.

The MyBTTS (BeaconTxTimeSlot) subfield indicates the beacon transmission time of a node that transmits a beacon. The Depth subfield indicates depth information about a node that transmits a beacon. The NAA (Next Address Available) subfield is used to inform the value of an address that will be newly allocated, and it complies with the Network Address Assign mechanism of a WiBEEM NWK layer.

The Child Short Address subfield is used to insert the address value of a child node which has a parent-child relationship and requests connection to a node that transmits a beacon. The Parent Short Address subfield is used to insert a node of a parent node corresponding to the address value of a child node (that is, its own address value) and process the node.

The Child Device Type subfield is divided into upper 4 bit and lower 4 bits and used. The lower 4 bits indicate whether a child node is a mobile type node or a fixed type device. The lower 4 bits are identical with the Mobility subfield of an MAC Capability data format, thus creating a value.

In other words, if the Mobility subfield is a mobile type node, the lower 4 bits of the Child Device Type subfield have a value of 1 so that the Child Device Type subfield is identical with the value of the Mobility subfield. If the Mobility subfield is a fixed type node, the lower 4 bits of the Child Device Type subfield have a value of 0. The upper bits are used in association with the management of a routing table which is performed in a network layer for a lower node having a Child Short Address value.

If a current lower node is associated with a node that transmits a beacon, the upper 4 bit value of 0 is transmitted in order to inform other nodes that the association continues. If the lower node is disassociated, the upper 4 bit value is changed to 1 in order to inform other nodes that the lower node having the Child Short Address value is now disassociated so that the routing table can be updated.

The My Profile ID subfield indicates the profile of WiBEEM. Whether a node uses the WiBEEM protocol can be checked based on the My Profile ID value.

The PQPL subfield is a subfield indicating a PQP Length and is generated when the value of a PQP Enabled within the Superframe Specification subfield of a beacon frame is 1. The PQPL subfield is a value necessary to calculate the length of a QoS period when QoS is used.

A maximum MaxBeaconPayloadLength octet may be designated in the Beacon Payload field configured as described above. If the maxBeaconPayloadLength is not 0, an octet included in a maxBeaconPayload has to be put into the Beacon Payload field. When a node receives a beacon including the Beacon Payload field, the node informs a network layer of the Beacon Payload field and processes pieces of information included in a Superframe Specification field and an Address List field. If an MAC receives a beacon not including the Beacon Payload field, the MAC immediately interprets the beacon and processes pieces of information included in a Superframe Specification field and an Address List field.

If the value of the PQP Enabled subfield within the Superframe Specification field of the above beacon frame is 1, it informs neighboring nodes that QoS data will be transmitted through this superframe. If the value of the PQP Enabled subfield is 0, it informs that there is no QoS data.

Figures 9, 10:
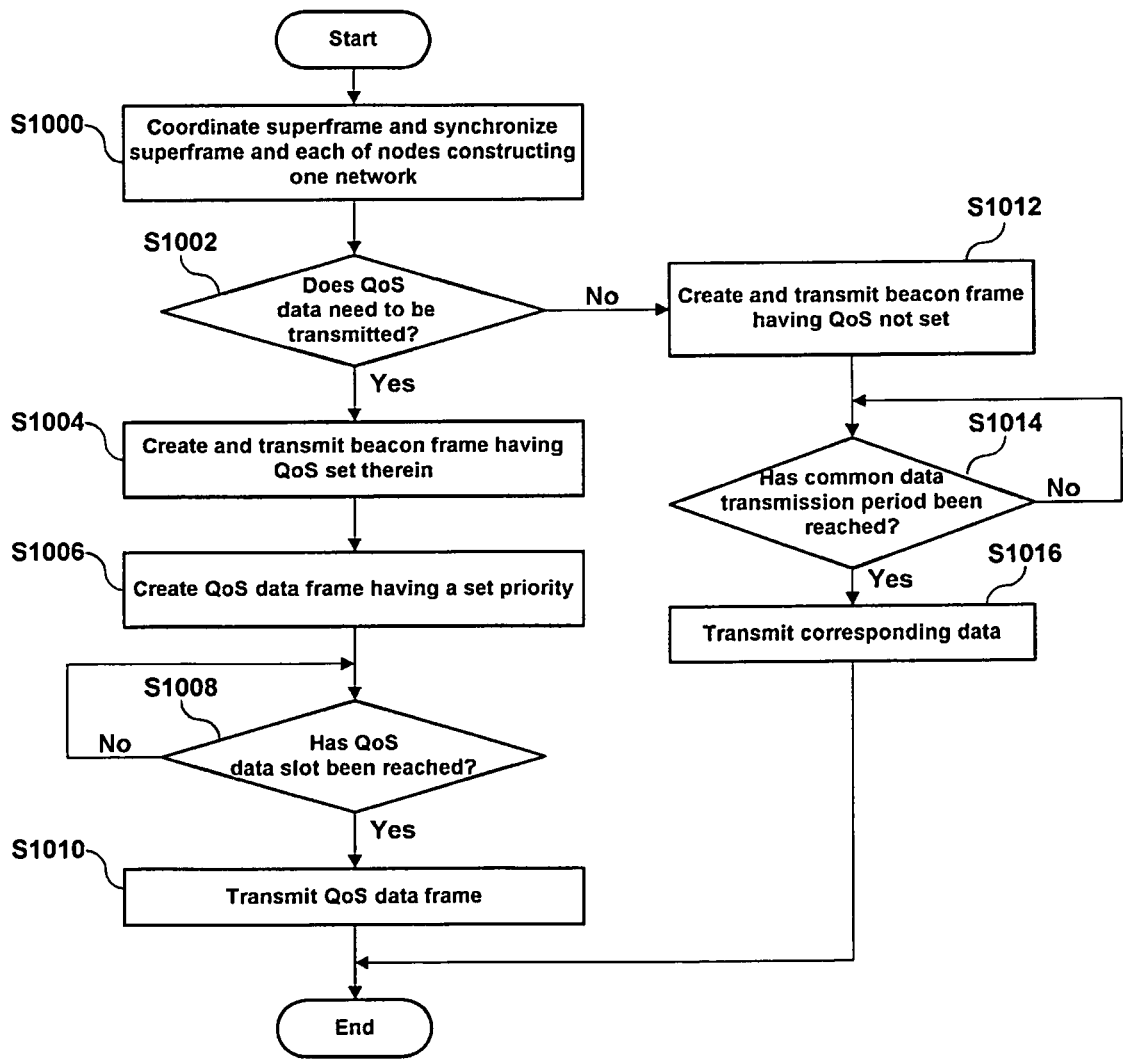
FIG. 9 is a diagram showing a QoS priority field value shown in FIG. 8.
FIG. 10 is a flowchart illustrating a method of the mesh coordinator transmitting a QoS data frame according to the present invention.

FIG. 8 is a diagram showing the structure of a QoS data frame in which QoS has been set according to the present invention, and FIG. 9 is a diagram showing a QoS priority field value shown in FIG. 8.

Referring to FIG. 8, the QoS data frame includes a Frame Control field having QoS priority set therein, a Sequence Number field indicating a sequence ID unique to a transmitted frame, four Addressing fields, a Frame Payload field, and a FCS (Frame Check Sequence) field for error detection.

The Frame Control Field consists of subfields, such as a Frame Type, Security Enabled, Frame Pending, Ack. Request, Intra-PAN, Destination Addressing Mode, QoS Priority, and Source Addressing Mode.

The Frame Type subfield indicates a data type when it is "001," an Acknowledgement type when it is "010", a MAC Command type when it is "011", and a beacon type when it is "000".

The Security Enabled subfield is set to "1" when an encryption operation for protecting a frame using a key stored in an MIB (MAC Information Base) is used and is set to "0" when the encryption operation is not used.

The Frame Pending subfield is set to "1" when there is additional data after current data is transmitted and is set to "0" when there is no more data. When the Ack. Request subfield to which 1 bit is allocated is set to "1", a reception terminal that transmits data or a MAC Command Frame has to send an Ack frame.

1 bit is allocated to the Intra-PAN subfield. The Intra-PAN subfield is determined when a MAC frame is transmitted in the same PAN or determined according to whether a MAC frame is transmitted in other PAN.

In the Destination Addressing Mode subfield and the Source Address Mode subfield each having 2 bits, "00" indicate that there are no a Mesh ID and an address field, and "01" is not used. Furthermore, "10" indicates a 16 bit Short Address field, and "11" indicates a 64 bit Extended Address field. The Sequence Number field having a length of 8 bits indicates a sequence ID unique to a transmitted frame.

The QoS Priority subfield uses 2 bits. Values in the MAC and NWK layers are compared with each other, thus having the same value.

The QoS Priority subfield divided into 2 bits is classified as in FIG. 9, and it has a limited number of backoffs according to priority.

Since a data size allocated for the QoS Priority subfield is 2 bits, priority is divided into a total of four cases. Data having priority 0 has a backoff value between 0 and 5, data having priority 1 has a backoff value between 0 and 7, data having priority 2 has a backoff value between 0 and 10, and data having priority has a backoff value between 0 and 15.

Data has higher priority according to a higher QoS Priority value. Data of higher priority has a change to be transmitted earlier than data of lower priority because it has a small number of backoffs. The Priority bit is a variable data bit which can use several bits according to user circumstances.

In this priority, in relation to management, QoS priority is selected in the Frame Control field. In the case of data, an application is determined and priority is then determined. Here, it is assumed that the highest priority is not commonly used when QoS data is formed.

It means the highest priority of higher priorities. The highest priority is emptied in order to use data or a management packet which should be transmitted very urgently and accurately. The highest priority is used when data or a management packet complying with this situation is used.

A node that transmits a QoS data frame first transmits data having the highest priority, from among QoS data generated by itself, and then transmits common data, not having priority, during the CAP period. A node that has received the QoS data frame transmits data having a higher priority, although it receives data of a lower priority within a PQP earlier than data of a higher priority.

A Destination Mesh Identifier field has a length of 16 bits or 64 bits and indicates a unique Mesh ID that receives a frame. A Destination Address field has a length of 16 bits or 64 bits and indicates the address of a node that receives a frame.

A Source Mesh Identifier field having a length of 16 bits indicates a unique Mesh ID that transmits a frame. A Source Address field having a length of 16 bits or 64 bits indicates the address of a node that transmits a frame.

The Frame Payload field has a variable length and has bytes of a maximum of 114 bytes and a minimum of 102 bytes. Data loaded on the payload includes information about an individual frame type. When the value of the Security Enabled field is set to 1, the payload is protected by a Security Suite.

The FCS subfield has a CRC (Cyclic Redundancy Check) of 16 bits.

Not only QoS data and common data can be distinguished from each other, but also priority can be allocated to QoS data by using a QoS data frame configured as described above.

FIG. 10 is a flowchart illustrating a method of the mesh coordinator transmitting a QoS data frame according to the present invention.

Referring to FIG. 10, the mesh coordinator coordinates a superframe including a QoS data slot and synchronizes the superframe and each of nodes constructing one network at step S1000.

That is, the mesh coordinator calculates a beacon interval, a superframe duration, a beacon-only period, a QoS data slot, and a common data transmission period and constructs a superframe composed of the beacon-only period BOP, the QoS data slot PQP, the contention access period CAP, the common data transmission period CFP, and the deep sleep mode period DSP in this order based on the pieces of calculated period information.

For a detailed description of the method of the mesh coordinator coordinating the superframe, reference can be made to FIG. 10. For a detailed description of the coordinated superframe, reference can be made to FIG. 4.

After step S1000 is performed, the mesh coordinator determines whether QoS data needs to be transmitted at step S1002.

If, as a result of the determination at step S1002, the QoS data needs to be transmitted, the mesh coordinator creates a beacon frame having QoS set therein and transmits the beacon frame in the beacon-only period of the superframe at step S1004.

That is, the mesh coordinator creates the beacon frame having QoS set therein by setting the value of a PQP Enabled subfield within the Super Specification field of the beacon frame to 1, determining whether QoS will be used during which period of the superframe, and indicating the PQPL value within the Beacon Payload field of the beacon frame. For a detailed description of the beacon frame, reference can be made to FIG. 4.

After step S1004 is performed, the mesh coordinator creates a QoS data frame having a set priority at step S1006 and determines whether a QoS data slot has been reached using the superframe at step S1008.

If, as a result of the determination at step S1008, the QoS data slot has been reached, the mesh coordinator transmits the created QoS data frame at step S1010.

If, as a result of the determination at step S1002, the QoS data needs not to be transmitted, the mesh coordinator creates a beacon frame, indicating that QoS is not used in the PQP Enabled subfield, and transmits the created beacon frame at step S1012.

Next, the mesh coordinator determines whether the common data transmission period has been reached at step S1014 and transmits a corresponding data frame in the common data transmission period at step S1016.

Figure 11:
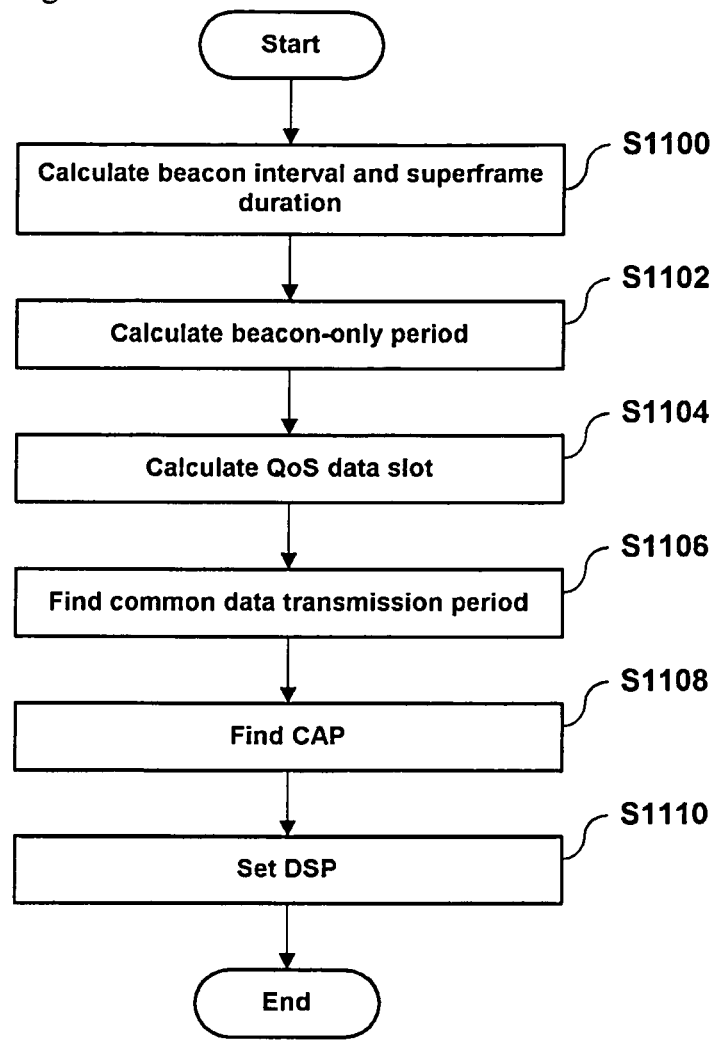
FIG. 11 is a flowchart illustrating a method of the mesh coordinator coordinating a superframe structure according to the present invention.

FIG. 11 is a flowchart illustrating a method of the mesh coordinator coordinating a superframe structure according to the present invention.

Referring to FIG. 11, the mesh coordinator calculates a beacon interval and a superframe duration at step S1100.

Next, the mesh coordinator finds a beacon-only period by calculating a BTTSL value and a maxBeaconNumber included in a beacon frame at step S1102) and finds a QoS data slot by calculating a PQPL value and aBaseDuration included in the beacon frame after finding the beacon-only period at step S1104.

Next, the mesh coordinator finds a common data transmission period by calculating a CFPL value and aBaseDuration included in the beacon frame at step S1106 and finds a CAP period using a value in which the beacon-only period, the QoS data slot, and the common data transmission period are subtracted from an SD (superframe duration) between the common data transmission period and the QoS data slot at step S1108.

Next, the mesh coordinator sets a period other than a aBaseSuperframeduration period in the calculated beacon interval as a deep sleep mode period DSP at step S1110.

Accordingly, the mesh coordinator can coordinate a superframe configured in order of the beacon-only period BOP, the QoS data slot PQP, the contention access period CAP, the common data transmission period CFP, and the deep sleep mode period DSP.

Figure 12:
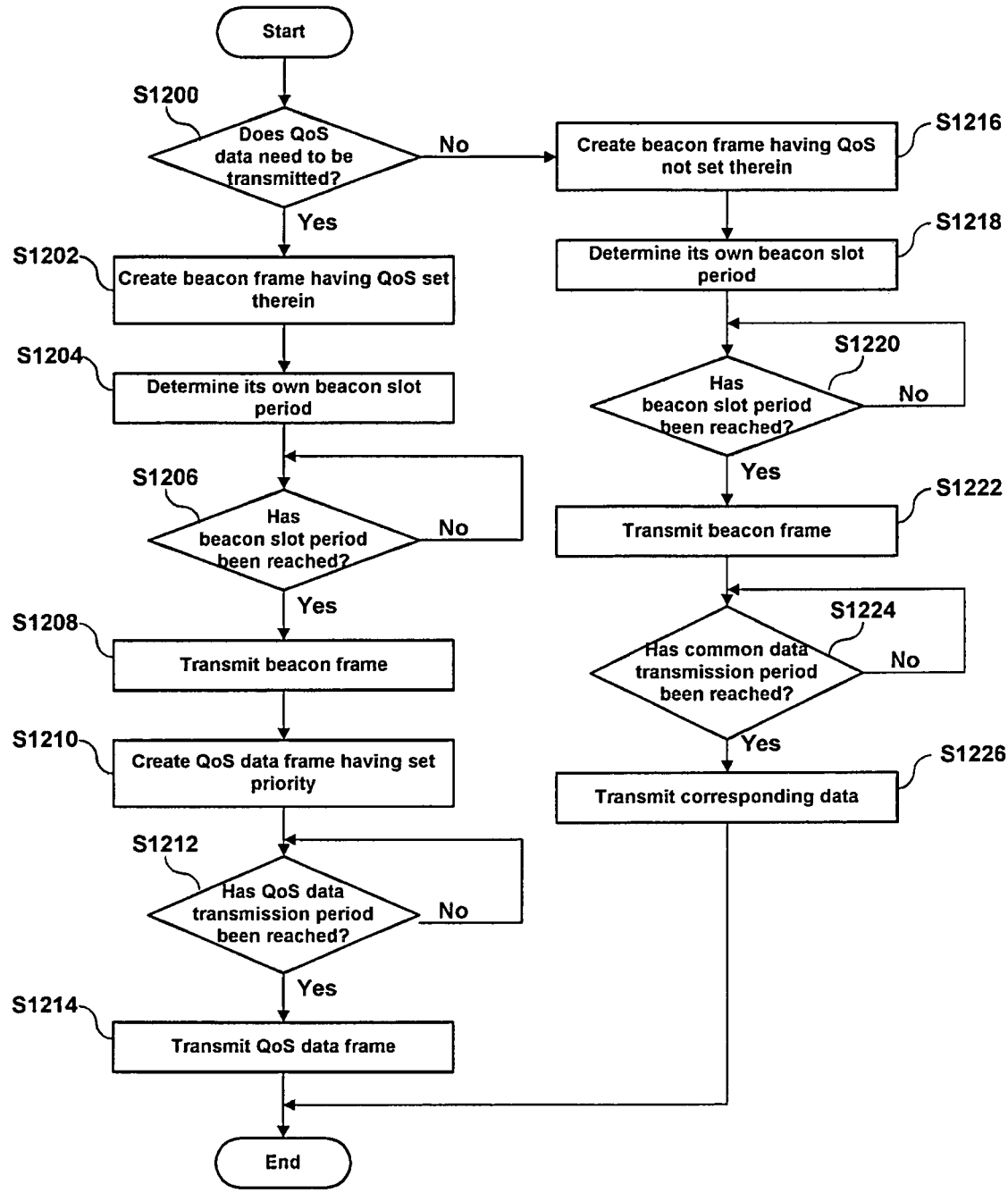
FIG. 12 is a flowchart illustrating a method of a node in which a ubiquitous sensor network has been configured transmitting a QoS data frame according to the present invention.

FIG. 12 is a flowchart illustrating a method of a node in which a ubiquitous sensor network has been configured transmitting a QoS data frame according to the present invention.

Referring to FIG. 12, the node determines whether QoS data needs to be transmitted at step S1200 and, if, as a result of the determination, the QoS data needs to be transmitted, creates a beacon frame having QoS set therein at step S1202. Here, the node has to be synchronized with a superframe coordinated by the mesh coordinator.

Next, the node determines its own beacon slot period in the beacon-only period of the superframe in order to transmit the created beacon frame at step S1204. That is, the node determines its own beacon slot in a period other than the beacon slots of neighboring nodes in the beacon-only period of the superframe.

When the determined beacon slot period is reached at step S1206, the node transmits the created beacon frame at step S1208 and creates a QoS data frame having a set priority at step S1210.

Next, the node determines whether the QoS data slot has been reached using the superframe at step S1212.

If, as a result of the determination at step S1212, the QoS data slot has been reached, the node transmits the created QoS data frame at step S1214. If two or more QoS data frames exist, the node transmits the two or more QoS data frames in the QoS data slot in order of higher priority.

If, as a result of the determination at step S1200, the QoS data needs not to be transmitted, the node creates a beacon frame indicating that QoS is not used in a PQP Enabled subfield at step S1216.

Next, in order to transmit the created beacon frame, the node determines its own beacon slot period in the beacon-only period of the superframe at step S1218. When the determined beacon slot period is reached at step S1220, the node transmits the created beacon frame at step S1222.

Next, the node determines whether a common data transmission period has been reached at step S1224 and transmits a corresponding data frame in the common data transmission period at step S1226.

As described above, a person having ordinary skill in the art to which the present invention pertains will understand that the present invention may be implemented in various detailed forms without changing the technical spirit or indispensable characteristics of the present invention. It will be understood that the above-described embodiments are illustrative and not limitative from all aspects. The scope of the present invention is defined by the appended claims rather than the detailed description, and the present invention should be construed to cover all modifications or variations induced from the meaning and scope of the appended claims and their equivalents.

INDUSTRIAL APPLICABILITY

As described above, the system and method for QoS support in a ubiquitous sensor network according to the present invention may be applied to techniques in which stable QoS for nodes within a wireless communication network can be supported, and the quality of data transmission needs to be guaranteed and stability needs to be secured according to data priority by placing priority to QoS data.

The invention claimed is:

1. A system for QoS (Quality of Service) support in a ubiquitous sensor network which provides communication between a plurality of nodes configuring one network, the system comprising:
a mesh coordinator for coordinating a superframe including a QoS data slot and synchronizing the superframe and each of nodes within the network,
wherein the mesh coordinator comprises a beacon frame control unit for creating a beacon frame for each node, including information about whether QoS has been set, a communication unit for broadcasting the created beacon frame in the superframe, creating a QoS data frame having a set priority, and transmitting the created QoS data frame in the QoS data slot of the superframe;
a beacon scheduling information control unit for transmitting beacon scheduling information to neighboring nodes and for informing the neighboring nodes that QoS data will be transmitted through the superframe, with the beacon scheduling information control unit comprising its own beacon slot information and beacon slot information about the neighboring nodes,
such that in response to the beacon slot information provided by said beacon scheduling information control unit the neighboring nodes determine their beacon slots, and
wherein the mesh coordinator or each of the nodes arrange a plurality of data frames in order of higher priority when the QoS is set and a plurality of data frames is received with the plurality of data frames being transmitted by the communication unit to other nodes in the arranged order of the higher priority and with the mesh coordinator further comprising a QoS data processing unit for allocating priority in the transmission of data between QoS data and common data with common data representing data which is not QoS data such that QoS data is transmitted by the mesh coordinator in the created QoS data frame in the QoS data slot of the superframe in order of higher priority before common data is transmitted and when the QoS has not been set data is transmitted by the mesh coordinator as common data and wherein a priority of the QoS data frame is set by the mesh coordinator for every node or by default for every node.

2. The system according to claim 1, wherein the superframe comprises a beacon-only period BOP which is a period where the beacon frame is transmitted, a QoS data slot PQP for QoS data transmission, a contention access period CAP, a common data transmission period CFP for common data transmission, and a deep sleep mode period DSP.

3. The system according to claim 1, wherein a priority of the QoS data frame is set by the mesh coordinator for every node or by default for every node.

4. The system according to claim 1, wherein each of the nodes is activated when its own address corresponds to the beacon frame when the beacon frame is broadcasted by the mesh coordinator or other nodes and is in an inactive state when the address does not correspond to the beacon frame.

5. A mesh coordinator for QoS support in a ubiquitous sensor network, comprising:
a communication unit for communicating with nodes;
a superframe structure coordinator unit for coordinating a superframe structure, including a QoS data slot, and synchronizing the superframe and each of the nodes configuring one network;
a beacon frame control unit for creating a beacon frame, including information about whether QoS has been set, and broadcasting the created beacon frame in a beacon-only period of the superframe created by the superframe structure coordinator unit; and
a QoS data processing unit for placing priority to a QoS data frame based on the information about whether QoS has been set, included in the beacon frame created by the beacon frame control unit, and transmitting the QoS data frame in the QoS data slot of the superframe,
wherein QoS data is transmitted by the mesh coordinator in a created QoS data frame in the QoS data slot of the superframe in order of higher priority before common data and when the QoS has not been set data is transmitted by the mesh coordinator as common data and
further comprising a beacon scheduling information control unit for transmitting beacon scheduling information, comprising its own beacon slot information and beacon slot information about neighboring nodes, to the neighboring nodes,
such that in response to the beacon slot information provided by said beacon scheduling information control unit the neighboring nodes determine their beacon slots and
wherein a priority of the QoS data frame is set by the mesh coordinator for every node or by default for every node.

6. The mesh coordinator according to claim 5, further comprising a common data processing unit for transmitting a relevant data frame in a common data transmission period of the superframe based on the information about whether QoS has been set, included in the beacon frame created by the beacon frame control unit.

7. The mesh coordinator according to claim 5, wherein the beacon frame control unit creates the beacon frame, comprising a Frame Control field, a Beacon Sequence Number field, a Source Address Information field, a Superframe Specification field indicating whether QoS has been set, CFP fields, a Pending Address Field indicating a specification of an address waiting for transmission, a Beacon Payload field indicating PQPL information, and an FCS field.

8. The mesh coordinator according to claim 7, wherein the Super Specification field comprises a Beacon Order subfield to stipulate a transmission interval of a beacon, a Superframe Order subfield to stipulate a length of time during a period where the superframe is active, including a beacon frame transmission time, a Final CAP Slot subfield to indicate a duration of CAP, a Battery life Extension subfield, a PQP Enabled subfield to indicate whether QoS has been set, a PAN Coordinator subfield, and an Association permit subfield.

9. The mesh coordinator according to claim 7, wherein the Beacon Payload field comprises a BOPL subfield to determine whether how many beacons will be transmitted within a BOP size, a MyBTTS (BeaconTxTimeSlot) subfield to indicate a beacon transmission time of a node transmitting a beacon, a BTTSL (Beacon Tx Time Slot Length) subfield to indicate a size of a beacon slot transmitted by itself, a Depth subfield to indicate depth information about a node transmitting a beacon, an NAA (Next Address Available) subfield to inform a value of an address to be newly allocated, a Child Short Address subfield to insert an address value of a child node having a parent-child relationship and requesting connection to a node transmitting a beacon, a Parent Short Address subfield to insert an address value of a parent node corresponding to the address value of the child node, a HOP Count subfield, a Child Device Type subfield, a My Profile ID subfield, and a PQPL subfield which is a PQP Length and generated when a value of PQP Enabled within the Super Specification field of the beacon frame is 1.

10. The mesh coordinator according to claim 7, wherein in case where QoS data is transmitted, the beacon frame control unit creates the beacon frame by setting a value of PQP Enabled within the Super Specification field of the beacon frame to 1, determining whether the QoS data will be transmitted during which period of the superframe, and indicating a PQPL value within the Beacon Payload field.

11. The mesh coordinator according to claim 5, wherein the QoS data processing unit creates the QoS data frame, comprising a Frame Control field having QoS priority set therein, a Sequence Number field indicating a sequence ID unique to a transmitted frame, four addressing fields, a Frame Payload field, and a Frame Check Sequence (FCS) field for error detection.

12. The mesh coordinator according to claim 5, wherein if two or more data is received within the QoS data slot, the QoS data processing unit arranges the two or more data according to priority and transmits the arranged data to other nodes in order of the priority.

13. A node for QoS support in a ubiquitous sensor network, comprising:
a communication unit configured to transmit and receive a beacon and data over a network using the superframe having a beacon-only period;
a superframe synchronization unit synchronized with the superframe received from a mesh coordinator through the communication unit;
a beacon slot determination unit configured to determine its own beacon slot in a period other than beacon slots of neighboring nodes from the beacon-only period of the superframe synchronized by the superframe synchronization unit and to control the communication unit so that a beacon frame is transmitted in the determined beacon slot;
a beacon frame control unit configured to create the beacon frame and to create a QoS data frame, including information about whether QoS has been set, and to transmit the created beacon frame in the beacon slot determined by the beacon slot determination unit; and
a QoS data processing unit configured to place priority to a relevant data frame based on the information about whether QoS has been set, included in the beacon frame created by the beacon frame control unit, and to transmit the data frame in a QoS data slot of the superframe and further comprising:
a beacon scheduling information control unit for transmitting beacon scheduling information, comprising the own beacon slot information and beacon slot information about neighboring nodes, to the neighboring nodes with the neighboring nodes determining their beacon slots in response to the beacon slot information provided by said beacon scheduling information control unit;
a common data processing unit for transmitting a relevant data frame in a common data transmission period of the superframe based on the information about whether QoS has been set, included in the beacon frame created by the beacon frame control unit, and
wherein if two or more data is received within the QoS data slot, the QoS data processing unit arranges the two or more data according to priority and transmits the arranged data to other nodes in order of the priority and
wherein a priority of the QoS data frame is set by the mesh coordinator for every node or by default for every node.

14. A method of a mesh coordinator as defined in claim 5 for transmitting a QoS data frame for QoS support in a ubiquitous sensor network communicating with nodes wherein each of the nodes configures one network; said method comprising the steps of:
(a) coordinating a superframe including a QoS data slot, configured in order of a beacon-only period BOP, a QoS data slot PQP, a contention access period CAP, a common data transmission period CFP, and a deep sleep mode period DSP, based on the pieces of calculated period information with the superframe being coordinated by calculating a beacon interval, a superframe duration, the beacon-only period, the QoS data slot, and a common data transmission period, and synchronizing the coordinated superframe and each of the nodes constructing one network;
(b) determining if QoS data needs to be transmitted;
(c) creating a beacon frame when QoS needs to be transmitted,
(d) transmitting the beacon frame in a beacon-only period of the superframe, and creating a QoS data frame having a set priority when QoS needs to be transmitted;
(e) transmitting the QoS data frame when the QoS data slot is reached according to the superframe; and
(f) if step (b) determines that QoS data does not need to be transmitted a beacon frame should be created having QoS not set with common data transmitted when the common data transmission period is reached and
wherein a priority of the QoS data frame is set by the mesh coordinator for every node or by default for every node.

15. The method according to claim 14, wherein the beacon frame having QoS set therein is created by setting a value of PQP Enabled within a Super Specification field to 1, determining whether the QoS data will be transmitted during which period of the superframe, and indicating a PQPL value within a Beacon Payload field.

16. The method according to claim 14 comprising the steps of:
calculating a beacon interval and a superframe duration;
finding a beacon-only period by calculating a BTTSL (Beacon Tx Time Slot Length) and a maximum beacon number (maxBeaconNumber), included in the beacon frame;
finding a QoS data slot by calculating a PQPL (PQP size) and aBaseDuration included in a beacon frame, after the found beacon-only period;
finding a common data transmission period by calculating a CFPL and aBaseDuration included in the beacon frame;
finding a CAP period using a value in which the beacon-only period, the QoS data slot, and the common data transmission period are subtracted from a superframe duration, between the common data transmission period and the QoS data slot; and
setting a period other than the superframe duration period in the calculated beacon interval as a deep sleep mode period DSP and
wherein a priority of the QoS data frame is set by the mesh coordinator for every node or by default for every node.

17. A method of a node according to claim 13 for transmitting a QoS data frame for QoS support in a ubiquitous sensor network communicating with nodes wherein each of the nodes configures one network, the method comprising the steps of:
(a) creating a beacon frame having QoS set therein and determining its own beacon slot period;
(b) transmitting the created beacon frame in the determined beacon slot period and creating a QoS data frame having a set priority; and
(c) transmitting the created QoS data frame in a QoS data slot of the superframe synchronized by the mesh coordinator and
wherein a priority of the QoS data frame is set by the mesh coordinator for every node or by default for every node.

18. A system for QoS (Quality of Service) support in a ubiquitous sensor network, the system comprising:
a mesh coordinator for coordinating a superframe including a QoS data slot and synchronizing the superframe and each of nodes within the network; and for creating a beacon frame, including information about whether QoS has been set, broadcasting the created beacon frame in the superframe, creating a QoS data frame having a set priority, and transmitting the created QoS data frame in the QoS data slot of the superframe and wherein the mesh coordinator includes a beacon scheduling information control unit for transmitting the neighboring nodes beacon scheduling information, comprising its own beacon slot information and beacon slot information about the neighboring nodes so that the neighboring nodes can determine their beacon slots in response to the beacon slot information provided by said beacon scheduling information control unit and a QoS data processing unit for placing priority in the created QoS data frame based on the information about whether QoS has been set, included in the beacon frame, and transmitting the QoS data frame in the QoS data slot of the superframe wherein a priority of the QoS data frame is set by the mesh coordinator for every node or by default for every node,
wherein QoS data is transmitted by the mesh coordinator in the created QoS data frame of the QoS data slot of the superframe in order of higher priority before common data is transmitted and when the QoS has not been set data is transmitted by the mesh coordinator as common data.

* * * * *